(12) United States Patent
Basso et al.

(10) Patent No.: US 12,378,486 B2
(45) Date of Patent: Aug. 5, 2025

(54) PROCESS AND PLANT FOR BIOMASS TREATMENT

(71) Applicant: HBI S.r.l., Bolzano (IT)

(72) Inventors: Daniele Basso, Renon (IT); Renato Pavanetto, Quinto Di Treviso (IT); Flavio Manenti, Bolzano (IT); Kristiano Prifti, Bolzano (IT)

(73) Assignee: HBI S.R.L., Bolzano (IT)

( * ) Notice: Subject to any disclaimer, the term of this patent is extended or adjusted under 35 U.S.C. 154(b) by 913 days.

(21) Appl. No.: 17/444,311

(22) Filed: Aug. 3, 2021

(65) Prior Publication Data

US 2022/0056356 A1 Feb. 24, 2022

(30) Foreign Application Priority Data

Aug. 7, 2020 (IT) .......................... 102020000019738

(51) Int. Cl.
| | |
|---|---|
| *C10J 3/72* | (2006.01) |
| *C01B 3/02* | (2006.01) |
| *C01B 3/52* | (2006.01) |
| *C02F 11/18* | (2006.01) |

(52) U.S. Cl.
CPC .................... *C10J 3/72* (2013.01); *C01B 3/02* (2013.01); *C01B 3/52* (2013.01); *C02F 11/18* (2013.01); *C10J 3/723* (2013.01); *C01B 2203/0415* (2013.01); *C01B 2203/048* (2013.01); *C02F 2303/02* (2013.01); *C10J 2300/0923* (2013.01)

(58) Field of Classification Search
CPC ................................. C01B 3/02; C10J 3/723
See application file for complete search history.

(56) References Cited

U.S. PATENT DOCUMENTS

| | | |
|---|---|---|
| 8,246,700 B1 | 8/2012 | Kutsin |
| 2005/0155288 A1 | 7/2005 | Rogers |
| 2013/0199920 A1 | 8/2013 | Demir |

FOREIGN PATENT DOCUMENTS

| | | |
|---|---|---|
| EP | 1347236 A1 | 9/2003 |
| EP | 1580253 A1 | 9/2005 |

OTHER PUBLICATIONS

Italian Search Report dated Mar. 19, 2021 from Italian Application No. IT102020000019738.

*Primary Examiner* — Peter F Godenschwager
(74) *Attorney, Agent, or Firm* — INNOVATION CAPITAL LAW GROUP, LLP; Vic Lin

(57) ABSTRACT

Described is a plant and process for biomass treatment, where the plant is configured to actuate said process which comprises:-a step A of thermochemical treatment of transformation of a biomass into a carbonaceous solid, where this transformation involves treating the biomass at a treatment temperature of between 150°° C. and 300° C. and at a treatment pressure of between 10 atm and 50 atm for 0.5-8 hours, in the presence of water, with accessory production of a treatment gas;-a step B of mixing the treatment gas with an auxiliary gas, to obtain operating gas;-a step C of thermochemical decomposition of the carbonaceous solid in an atmosphere consisting of the operating gas, where the thermochemical decomposition is suitable to obtain a combustible synthesis gas. step.

5 Claims, 1 Drawing Sheet

PROCESS AND PLANT FOR BIOMASS TREATMENT

TECHNICAL FIELD

This invention relates to a process and plant for the treatment of biomass and particularly suitable for the treatment of biomass.

The invention in particular relates to a process and plant which allow the production of products useful for energy production in combination with a hydrothermal carbonization of sewage sludge.

BACKGROUND ART

The hydrothermal carbonization process of sewage sludge currently presents some unsolved problems.

In fact, this process results in the production of strongly odorous gases which cause olfactory discomfort if released into the atmosphere.

On the other hand, a treatment of these gases, aimed at reducing the odorous component is technically complex and consequently expensive due to the small size of the odorous molecules and the consequent ineffectiveness of the filtration systems that can be used for the general reduction of polluting particles present in a gas.

Moreover, these gases generally comprise particles which are harmful to health and especially potentially carcinogenic.

These odorous substances are typically sulfur compounds, oxygenated compounds, such as alcohols, aldehydes, ketones, acids and esters, or aromatics, terpenes, halogenated compounds and saturated and unsaturated hydrocarbons. Some of these compounds, in trace amounts, including chlorofluorocarbons (CFCs), affect the environment through global warming, ozone depletion and photochemical ozone formation.

Other substances contained in said gases can be carbon disulfide and toluene which can cause toxicity to humans.

For this reason, the need is strongly felt to treat these gases in a simple and effective way in order to reduce their odorous component and the polluting charge which is harmful to health and the environment.

A further problem associated with this process consists in the uncertainty of the chemical composition of the gaseous fraction produced, the release of which into the atmosphere is therefore potentially harmful where polluting particles or molecules are present in the gas, that is, harmful to health and/or the environment.

SUMMARY OF THE INVENTION

The problem underlying the invention is therefore that of allowing a reduction in the environmental impact and the energy for treatment of a biomass. The task of a biomass treatment process and plant according to the invention is therefore to solve this problem.

In this context, an aim of the invention is to propose a process and plant for the treatment of biomass which allows a reduction in the need to treat process waste products such as gases or liquids.

Another aim of the invention is to provide a process and plant for the treatment of biomass which allows the diffusion into the atmosphere of the odorous and/or polluting molecules typically resulting from a hydrothermal carbonization of biomass to be avoided.

Yet another aim of the invention is to propose a process and plant for the treatment of biomass which allows the above-mentioned odorous and polluting molecules to be eliminated from the gaseous fraction.

A further aim of the invention is to provide a process and plant for the treatment of biomass which allows an energy recovery from the treated sludge to be achieved.

Another aim of the invention is to propose a process and plant for the treatment of biomass which allows products useful for energy production to be obtained.

A further aim of the invention is to provide a process and plant for treating biomass which allows the energy balance to be improved with respect to a traditional sewage sludge treatment process.

Another aim of the invention is to make available a process and plant for the treatment of biomass which allows a circular energy economy to be implemented where waste products of a step or a stage can be used as raw material for a different step or a different stage. This purpose, as well as these and other aims which will emerge more fully below, are achieved by a process and plant for the treatment of biomass according to the attached independent claims.

Detailed features of a process and plant for the treatment of biomass according to the invention are indicated in the dependent claims.

Further features and advantages of the invention will emerge more fully from the description of a preferred but not exclusive embodiment of a process and plant for the treatment of biomass according to the invention, illustrated by way of non-limiting example in the accompanying drawings listed below.

DETAILED DESCRIPTION

Figure 1:
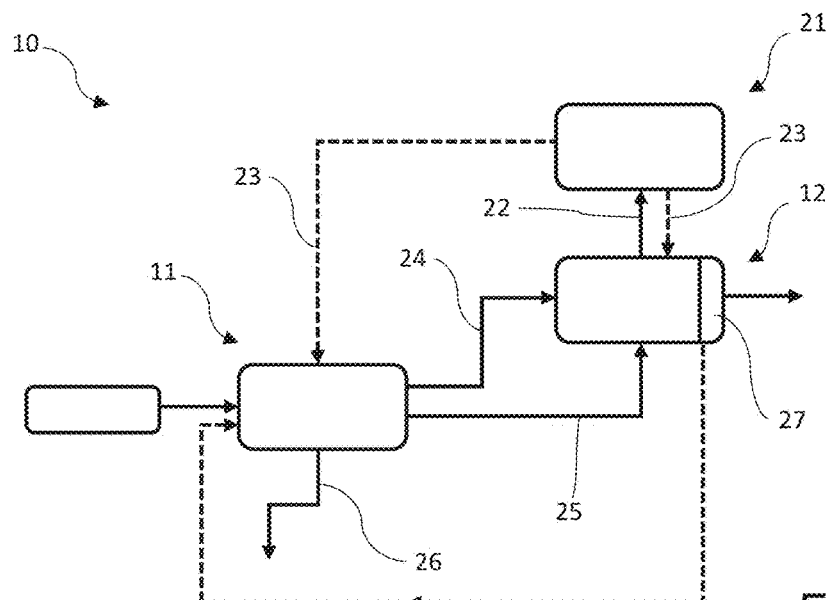
FIG. 1 shows a schematic diagram of a plant for treating biomass.
Figure 2:
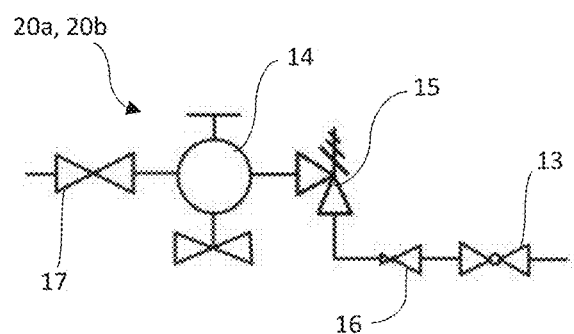
FIG. 2 shows a schematic diagram of a detail of a plant for treating biomass relative to feeding means.

With particular reference to the above-mentioned figures, a plant for the treatment of biomass is denoted in its entirety by 10, which according to this invention carried out a process which comprises:

a step A of thermochemical treatment of transformation of a biomass, which can comprise sewage sludge into a carbonaceous solid, where this transformation involves treating the biomass at a treatment temperature of between 150° C. and 300° C. and at a treatment pressure of between 10 atm and 50 atm, in the presence of water, with accessory production of a treatment gas which includes steam, carbon dioxide, nitrogen and sulfur compounds and traces of carbon monoxide and light aromatic hydrocarbons and polluting and odorous components;

a step B of mixing said treatment gas with an auxiliary gas containing oxygen compounds, to obtain operating gas;

a step C of thermochemical decomposition of said carbonaceous solid in an atmosphere consisting of said operating gas, where the thermochemical decomposition is suitable to obtain a combustible synthesis gas which mainly comprises carbon monoxide, molecular hydrogen, methane and carbon dioxide.

The transformation of step A can last from a few minutes to a few hours, such as, for example, from about 30 minutes to 8 hours.

The polluting and odorous components may comprise one or more of sulfur compounds;
oxygenated compounds, such as alcohols, aldehydes, ketones, acids and esters;
aromatic compounds;
terpenes;
halogenated compounds;
saturated and unsaturated hydrocarbons;
chlorofluorocarbons (CFCs);
carbon disulfide;
toluene.

According to the invention, the operating gas determines an oxygen supply in the thermochemical decomposition which is in a sub-stoichiometric amount.

Moreover, in accordance with the invention, said polluting and odorous components are decomposed in step C.

In other words, the invention envisages using the treatment gas, that is, the gas produced in a step A, of the thermochemical transformation treatment of a biomass, to produce synthesis gas in the thermochemical decomposition step C of said carbonaceous solid.

In this way, not only the polluting and odorous components contained in the treatment gas produced in step A are decomposed without requiring special purification and/or filtration operations, as in traditional processes, but the treatment gas itself is used as a raw material in step C to produce synthesis gas that can be used as a fuel in an energy production process.

According to an aspect of the invention, the carbonaceous solid deriving from biomass, produced in step A is also used as a raw material in step C, being treated in an atmosphere containing the same treatment gas produced in step A to obtain the above-mentioned synthesis gas, obtaining a high process synergy.

According to the invention, said thermochemical decomposition comprises, or consists of, either:

a gasification operation of said carbonaceous solid;
a pyrolysis operation of said carbonaceous solid;
a pyro-gasification operation of said carbonaceous solid;
a combustion operation of said carbonaceous solid.
an oxygen and/or steam combustion and/or gasification operation of said carbonaceous solid.

The oxygen supply in said thermochemical decomposition of step C, according to the invention, can be determined by means of a first adjustment operation, which provides for regulating a relative quantity of said treatment gas and of said auxiliary gas in said operating gas, and/or by a second adjustment operation of a flow rate of said operating gas in said thermochemical decomposition.

In other words, said oxygen supply can be regulated both by regulating the relative quantities of treatment gas and auxiliary gas mixed to form said operating gas, and by regulating the flow rate of said operating gas.

A biomass treatment process according to the invention can comprise a step D of production of electric and/or thermal energy in which said synthesis gas is used as fuel. According to the invention, at least a fraction of electrical and/or thermal energy produced in step D is used in step A and/or in step C so as to reduce the external amount to the plant in question of energy from the biomass treatment process according to the invention.

From a structural point of view, a plant 10 for the treatment of biomass according to the invention comprises:

a thermochemical treatment apparatus 11, configured to carry out said step A to obtain said carbonaceous solid and said treatment gas from a biomass;
a thermochemical decomposition apparatus 12, connected to the thermochemical treatment apparatus 11 to receive said carbonaceous solid and said treatment gas and configured to carry out said step C to obtain said synthesis gas;
supply means configured to feed the treatment gas and the auxiliary gas into the thermochemical decomposition apparatus 12 so as to determine an oxygen supply in the thermochemical decomposition apparatus 12, supplied by the treatment gas and by the auxiliary gas, which is in a sub-stoichiometric amount in said thermochemical decomposition.

The thermochemical treatment apparatus 11 according to invention can optionally comprise:

reactors, for example 4, mounted on load cells or other weighing devices, to control the mass fed and to control the process, which can be equipped with an agitator suitable for exchange with the external surface; these reactors can be configured to operate at a design pressure which can be 30 bar and at a temperature which can be 300° C. and can have a capacity of 200 litres or greater;
material transfer units between the reactors and further components of the plant by means of pressurization, for example by means of pumps;
a heat exchanger for energy recovery connected to the transfer units to recover heat from the fluid passing through them;
a diathermic oil generator or boiler or heating strips, associated with the reactors to transmit heat to the latter;
a raw material loading pump, connected to an inlet of the reactors to feed them;
pipes with special valves and instrumentation for connecting the parts of the thermochemical treatment apparatus 11;
a product storage, loading and unloading system;
ancillary units such as pumps, heating resistors, gearmotors, pressure transducers, thermocouples, etc.

Moreover, the thermochemical decomposition apparatus 12 according to the invention can comprise at least one gasification reactor, a filtering section composed of, for example, a cyclonic device, a scrubber, bag filters, mutually connected in a traditional manner and not described further.

According to the invention, said feeding means can comprise a mixing unit comprising an outlet and two inlets, one of which is connected to the thermochemical treatment apparatus 11 and the other to a supply of said auxiliary gas.

Each of these inputs can comprise at least one of the following:

a first valve unit 13, configured to modulate a flow rate of gas passing through it;
a filter regulator 14;
a second safety valve unit 15, configured to close the inlet upon receipt of an activation signal;
a third valve unit 16 configured to limit a gas pressure entering the mixing unit through said inlet;
a fourth valve unit 17 designed to close said inlet on command.

The plant 10, according to the invention, can comprise a reactor 18 having:

an upper portion 18a designed to house said carbonaceous solid;

a lower portion 18b defining an operating chamber connected to said supply means for receiving said treatment gas and said auxiliary gas or said operating gas;

a separation partition 19 equipped with openings for the passage of gas from the lower portion 18b to the upper portion 18a.

The reactor 18 can be configured in such a way that in a predefined configuration of use, the upper portion 18a is located above the lower portion 18b for the passage of heat and gaseous fluids from the lower portion 18b to the upper portion 18a.

Figure 3:
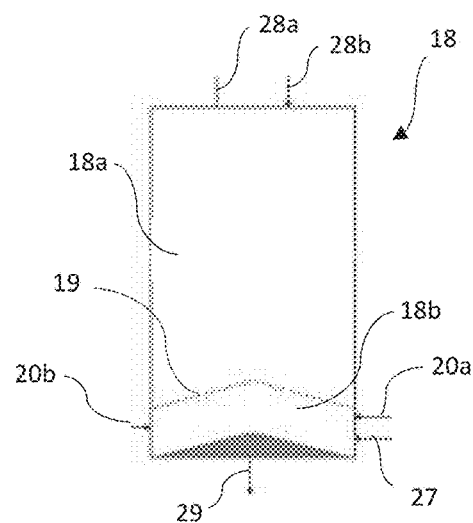
FIG. 3 shows a simplified diagram of detail of a plant for treating biomass relative to a thermochemical decomposition apparatus.

The thermochemical decomposition apparatus 12 according to the invention can comprise a reactor 18 having two of said inputs, which in the example of FIG. 3 are indicated with the references 20a and 20b, one of which is connected to the thermochemical treatment apparatus 11 and the other to a supply of said auxiliary gas.

The reactor 18 may also have a steam inlet 27 for enriching with steam the above-mentioned operating gas.

Moreover, the upper portion 18a can have an outlet 28a for synthesis gas and a inlet 28b for loading carbonaceous solid, and the lower portion can have an outlet for residues 29.

Each of the inputs 20a, 20b, similarly as described above, can optionally comprise at least one of:
- a first valve unit 13, configured to modulate a flow rate of gas passing through it;
- a filter regulator 14;
- a second safety valve unit 15, configured to close said inlet upon receipt of an activation signal;
- a third valve unit 16 configured to limit a gas pressure entering said mixing group through said inlet;
- a fourth valve unit 17 designed to close said inlet on command.

According to the invention, the plant 10 can also comprise a generator unit 21 configured to generate electrical energy and/or thermal energy by burning a fuel.

The generator unit 21 can be connected, for example by means of a duct 22, to the thermochemical decomposition apparatus 12 to receive the synthesis gas to use the latter as a fuel.

According to the invention, the generator unit 21 can be connected, for example by means of the connections 23 of FIG. 1, to the thermochemical treatment apparatus 11 and/or to the thermochemical decomposition apparatus 12 to supply thermal and/or electrical energy for the operation of the thermochemical treatment apparatus 11 and/or the thermochemical decomposition apparatus 12, respectively.

The thermochemical treatment apparatus 11, according to the invention, can be connected to the thermochemical decomposition apparatus 12 by means of a first connecting element 24, configured to transfer the treatment gas to the thermochemical decomposition apparatus 12.

The thermochemical treatment apparatus 11, according to the invention, can also be connected to the thermochemical decomposition apparatus 12 by means of a second connecting element 25, configured to transfer to the latter the carbonaceous solid produced in step A.

The thermochemical treatment apparatus 11, according to the invention, may also be equipped with an outlet 26 designed for removing residual liquids from the execution of step A.

A process according to the invention can also comprise:
- a step E which provides for filtering by washing, for example with water or an aqueous solution, the synthesis gas produced in said step C, for example in a scrubber, obtaining a waste liquid containing hydrocarbons;
- a step F of adding said waste liquid to the biomass before the thermochemical treatment of step A.

From a structural point of view, correspondingly, a plant according to the invention can comprise a washing filter 27, preferably a scrubber, connected to said thermochemical decomposition apparatus 12 or integrated in the latter and configured to carry out a filtration by washing the synthesis gas produced therein.

The washing filter 27 can be connected to the thermochemical treatment apparatus 11 to supply the latter with a waste liquid deriving from said filtration of the synthesis gas and comprising hydrocarbons.

In this way, the recirculation of this waste liquid to the head of the thermochemical treatment apparatus 11, that is, to the HTC unit, allows both elimination of the problem of disposing of this waste liquid, which is particularly dangerous for the hydrocarbons, or TAR, which it contains, and recovery of the carbon contained therein, in particular in the TAR, and therefore the overall energy efficiency of the plant according to the invention to be increased.

In fact, thanks to a process/plant according to the invention, a greater quantity of carbon is obtained in the carbonaceous solid, or hydrochar, which increases its calorific value and, therefore, allows a greater wealth of methane and carbon dioxide present in the synthesis gas, which therefore allows a greater energy production in its use as a fuel. Moreover, another advantage is that of allowing the percentage of water necessary in the thermochemical treatment apparatus 11 to optimally implement step A to be reached, which can consist of 80-85% of the mass, without adding water taken from the outside, but using that of the washing filter 27, or scrubber.

In fact, the carbon of the TAR, contained in the washing water, that is, in the waste liquid, is condensed/polymerized/adsorbed in the carbonaceous solid produced in the thermochemical treatment apparatus 11.

The carbon content of the carbonaceous solid therefore increases and consequently its calorific value and its mass increase.

For this reason, since the carbonaceous solid, or hydrochar in jargon, is used inside the thermochemical decomposition apparatus 12, or gasification unit, to produce energy, the overall efficiency of the plant increases.

The invention therefore allows the treatment gas generated in the thermochemical treatment of biomass, that is, by HTC, to be used, which in traditional solutions is a waste, as an oxidizing agent (productive input) in step C of thermochemical decomposition, or gasification, thus eliminating both the problem of the odours of the treatment gas, and that of dangerous and/or noxious emissions for the environment and for man, and reducing the need to use oxygen and/or air in the subsequent gasification step.

On the other hand, the washing water of the scrubbers, loaded with hydrocarbons (typically called "tar") is used as production input in the HTC system, thus offering the following advantages:
- the elimination of water as a special waste to be disposed of (that is, washing water) and the possibility of recovering carbon (coming from the tar) by making it polymerize/adsorb on hydrochar in step A and, therefore, increasing the calorific value and, consequently, increasing the overall energy efficiency of the integrated system.

The HTC waste therefore becomes gasification input, while the water waste from the gasification scrubbers becomes HTC input, thus configuring the system not only as integrated, but also as perfectly circular.

The invention, in general, therefore makes available a technique to eliminate (or reduce) the environmental and human health impacts of combined technologies and/or integrated systems for the thermochemical treatment of a biomass, or HTC, and thermochemical decomposition of the carbonaceous solid obtained from the latter, or gasification, making a synergy between said technologies possible.

It is therefore understood how a plant and/or process for the treatment of biomass according to the invention allows the diffusion into the atmosphere of the odorous and polluting molecules, typically resulting from a thermochemical treatment such as for example from a hydrothermal carbonization of biomass, to be avoided.

A plant and/or process for treating biomass according to the invention allows the above-mentioned odorous and polluting molecules to be eliminated from the gaseous fraction.

Moreover, a process and/or plant for the treatment of biomass according to the invention, allows a considerable energy saving to be obtained, compared to traditional biomass thermochemical treatments.

The invention as it is conceived is susceptible to numerous modifications and variants, all falling within the scope of protection of the appended claims.

Further, all the details can be replaced by other technically-equivalent elements.

Where the operating and technical features mentioned are followed by signs or reference numbers, the signs or reference numbers have been used only with the aim of increasing the intelligibility of the description and claims themselves and, consequently, they do not constitute in any way a limitation to the interpretation of each element identified, purely by way of example, by the signs or reference numerals.

The invention claimed is:

1. A process for biomass treatment which includes:
a step A, of thermochemical treatment of transformation of a biomass comprising sewage sludge into a carbonaceous solid, wherein said transformation provides treating said biomass at a treatment temperature between 150° C. and 300° C. and at a treatment pressure between 10 atm and 50 atm for a time, between 30 minutes and 8 hours, in the presence of water, with accessory production of a treatment gas including steam, carbon dioxide, nitrogen and sulfur compounds and traces of carbon monoxide and light aromatic hydrocarbons and polluting and odorous components;
a step B, mixing of said treatment gas with an auxiliary gas containing oxygen compounds to obtain operating gas;
a step C of thermochemical decomposition of a carbonaceous solid in an atmosphere consisting of said operating gas, wherein said thermochemical decomposition is apt to obtain a combustible synthesis gas which comprises carbon monoxide, molecular hydrogen, methane and carbon dioxide;
wherein said operative gas determines an oxygen supply in said thermochemical decomposition which is determined by means of a first adjustment operation, which provides regulating a relative quantity of said treatment gas and of said auxiliary gas in said operating gas, and/or by a second operation of regulating a flow rate of said operating gas in said thermochemical decomposition;
wherein said polluting and odorous components are decomposed in said step C.

2. The process according to claim 1 wherein said thermochemical decomposition comprises either:
a gasification operation of said carbonaceous solid;
a pyrolysis operation of said carbonaceous solid;
a pyro-gasification operation of said carbonaceous solid;
a combustion operation of said carbonaceous solid; or
an oxygen and/or steam combustion and/or gasification operation of said carbonaceous solid.

3. The process according to claim 2 wherein said oxygen supply in said thermochemical decomposition is determined by means of a first adjustment operation, which provides regulating a relative quantity of said treatment gas and of said auxiliary gas in said operating gas, and/or by a second operation of regulating a flow rate of said operating gas in said thermochemical decomposition.

4. The process according to claim 1 comprising a step D for the production of electrical and/or thermal energy in which said synthesis gas is used as a fuel;
at least a fraction of said electrical and/or thermal energy being used in said step A and/or in said step C.

5. The process according to claim 1 comprising-a step E which provides filtering by washing the synthesis gas produced in said step C to obtain a waste liquid containing hydrocarbons;
a step F of adding said waste liquid to said biomass before the thermochemical treatment of said step A.

* * * * *